United States Patent
Sona

(10) Patent No.: US 9,825,519 B2
(45) Date of Patent: Nov. 21, 2017

(54) IN SITU OVERVOLTAGE PROTECTION FOR ACTIVE BRIDGE APPLICATIONS

(71) Applicant: STMicroelectronics International N.V., Schiphol (NL)

(72) Inventor: Saurabh Sona, Greater Noida (IN)

(73) Assignee: STMICROELECTRONICS INTERNATIONAL N.V., Schiphol (NL)

( * ) Notice: Subject to any disclaimer, the term of this patent is extended or adjusted under 35 U.S.C. 154(b) by 0 days.

(21) Appl. No.: 14/788,704

(22) Filed: Jun. 30, 2015

(65) Prior Publication Data
US 2017/0005568 A1    Jan. 5, 2017

(51) Int. Cl.
| | |
|---|---|
| H02H 7/09 | (2006.01) |
| H02M 1/32 | (2007.01) |
| H02P 7/00 | (2016.01) |
| H02P 29/024 | (2016.01) |
| H02M 5/458 | (2006.01) |
| H02H 7/122 | (2006.01) |

(52) U.S. Cl.
CPC ............ H02M 1/32 (2013.01); H02H 7/1222 (2013.01); H02M 5/458 (2013.01); H02P 7/00 (2013.01); H02P 29/0241 (2016.02)

(58) Field of Classification Search
CPC .. H02P 29/0241; H02H 7/1252; H02H 9/042; H02H 9/043
USPC .................................................... 318/400.22
See application file for complete search history.

(56) References Cited

U.S. PATENT DOCUMENTS

| | | | | |
|---|---|---|---|---|
| 5,814,954 A | * | 9/1998 | Suzuki | H02H 5/047 |
| | | | | 307/68 |
| 9,071,182 B2 | * | 6/2015 | Yoshida | H02P 29/024 |
| 9,520,711 B1 | * | 12/2016 | Xiong | H02H 7/122 |
| 2008/0304189 A1 | * | 12/2008 | Tang | H02H 7/0838 |
| | | | | 361/33 |

(Continued)

FOREIGN PATENT DOCUMENTS

KR   2010029596 A  *  3/2010  ............. G02F 1/133

OTHER PUBLICATIONS

Bum-Seok Suh, A circuit Design for Clamping an overvoltage in Three-level GTO Inverters, 1994, IEEE, pp. 651-656.*

(Continued)

*Primary Examiner* — Bentsu Ro
*Assistant Examiner* — Bickey Dhakal
(74) *Attorney, Agent, or Firm* — Seed Intellectual Property Law Group LLP

(57) ABSTRACT

An overvoltage protection device protects a half bridge circuit that receives a supply voltage. The overvoltage protection device includes a high speed overvoltage detector that receives the supply voltage, detects whether an overvoltage situation is present, and outputs an overvoltage signal that disables the switches of the half bridge circuit before the switches can be damaged by the overvoltage situation. With both the switches of the half-bridge disabled, the entire supply voltage appears across the two switches in series, by which each switch only receives half the entire voltage. Thus, by quickly disabling both switches of the half-bridge each switch only needs a maximum voltage rating equal to half the maximum voltage rating of the half bridge circuit as a whole. This leads to reduced size and cost for the switches of the half-bridge circuit.

19 Claims, 5 Drawing Sheets

(56) References Cited

U.S. PATENT DOCUMENTS

2010/0253250 A1* 10/2010 Marvelly ............... H02P 6/085
                                                                                    318/3

OTHER PUBLICATIONS

T.A. Meynard, Multi-Level Conversion: High Voltage Choppers and Voltage-Source Inverters, 1992, IEEE, pp. 397-403.*

* cited by examiner

IN SITU OVERVOLTAGE PROTECTION FOR ACTIVE BRIDGE APPLICATIONS

BACKGROUND

Technical Field

The present disclosure relates to the field of overvoltage protection and, more particularly, to in situ overvoltage protection for active bridge applications.

Description of the Related Art

Active switches such as MOS transistors, bipolar transistors, and IGBTs are used in bridge circuits for controlled rectification and inverter stages.

One common type of bridge circuit is the H-bridge. The H-bridge is formed by connecting two half bridges in parallel. Typically, each half bridge includes two active switches in series. A 3-phase bridge, typically used in brushless DC motor control, is formed by connecting three half bridges in parallel.

In applications where AC mains are rectified and filtered to generate a DC bus voltage supply for powering the active bridge inverter, overvoltage protection schemes are typically employed to protect the bridge circuit and the load from overvoltage conditions on the AC main.

Existing methods are usually less effective for persistent or long duration overvoltage conditions or add significant cost and hardware penalties.

BRIEF SUMMARY

One embodiment is a bridge circuit including in situ overvoltage protection for switches of a power stage of the bridge circuit. A voltage source provides a supply voltage to the power stage and to a high speed overvoltage detector. The overvoltage detector detects whether there is an overvoltage condition in the supply voltage by comparing the supply voltage to a threshold voltage. If the supply voltage is higher than the threshold voltage, the overvoltage detector outputs an overvoltage signal that disables the switches of the half bridge circuit before the switches can be damaged by the overvoltage situation. In one embodiment, the power stage includes a half bridge. The half bridge includes two switches connected in series. When the overvoltage detector outputs the overvoltage signal, both switches in the half bridge are disabled. With both switches of the half-bridge disabled, the entire supply voltage appears across the two series switches, by which only half the total supply voltage appears across each individual switch. By judiciously turning off both the switches in a half bridge during overvoltage conditions, the circuit can protect from overvoltage conditions indefinitely without the cost penalty due to use of additional high voltage switches. A power stage using this scheme still has the same voltage rating as the individual switches, but is now capable of withstanding two times the rated voltage even during sustained overvoltage fault conditions.

Thus, by quickly disabling both switches of the half-bridge, each switch only needs a maximum voltage rating equal to half the maximum voltage rating of the power stage as a whole. This can lead to reduced size and cost for the switches of the power stage.

The overvoltage detector can be included with bridge circuits having multiple half bridges. For example, a bridge circuit can include three half bridge circuits each including two switches in series. The overvoltage detector can disable all of the switches of the half bridge circuit so that the ability of the bridge circuit to withstand overvoltage conditions is doubled. The in situ overvoltage protection can be included with applications other than bridge circuits.

DETAILED DESCRIPTION

Figure 1:
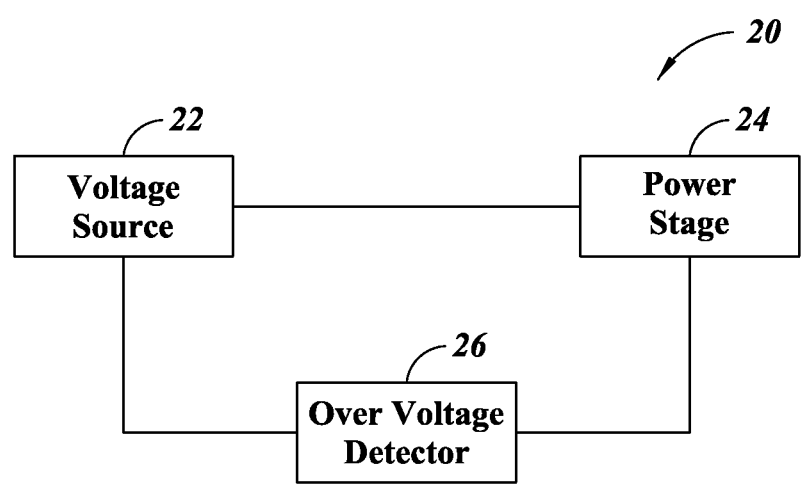
FIG. 1 is a block diagram of a bridge circuit including an overvoltage detector, according to one embodiment.

FIG. 1 is a block diagram of a bridge circuit 20, according to one embodiment. The motor control circuit includes a voltage source 22 and a power stage 24 coupled to the voltage source 22. The bridge circuit 20 further includes an overvoltage detector 26 coupled to the voltage source 22 and the power stage 24.

The voltage source 22 outputs a supply voltage to the power stage 24. In one embodiment the supply voltage is a DC voltage. Alternatively, the supply voltage can be an AC voltage such as a two phase or three phase voltage.

The power stage 24 receives the supply voltage and provides one or more output voltages. In one embodiment, the bridge circuit includes one or more half bridge circuits each including a pair of switches connected in series. The output voltages of the bridge circuit can include voltages present at the midpoint of each half bridge. The output voltages can be supplied to a load, such as a motor. In this way, the power stage 24 can drive the motor of an electrical appliance, and industrial device, or many other kinds of electrical devices.

In some situations, the voltage source can output an overvoltage in which the supply voltage is higher than normal, or higher than the bridge circuit or its load can safely endure. In such a case the bridge circuit and/or the load can be damaged or destroyed if overvoltage protection measures are not taken.

In order to protect the power stage 24, bridge circuit 20 provides the supply voltage to the overvoltage detector 26. The overvoltage detector 26 detects whether the supply voltage is in an overvoltage state. If the supply voltage is in an overvoltage state the overvoltage detector 26 outputs a disable signal that disables the switches of the power stage 24. In particular, the overvoltage detector 26 is a high speed overvoltage detector that detects the overvoltage condition and disables the switches of the power stage 24 before the switches can be damaged by the overvoltage condition. In this way, the overvoltage detector 26 protects the switches of the power stage 24 from overvoltage conditions in the supply voltage.

In one embodiment, the disable signal disables each of the switches of the power stage 24, rendering all of the switches nonconductive. Because the switches of the power stage 24 are nonconductive, the entire supply voltage appears across each pair of series connected switches in the power stage 24. This permits the bridge circuit as a whole to withstand overvoltage conditions that are doubled for similar individual components. Each switch can be smaller, and thus less expensive for the entire bridge circuit.

Figure 2:
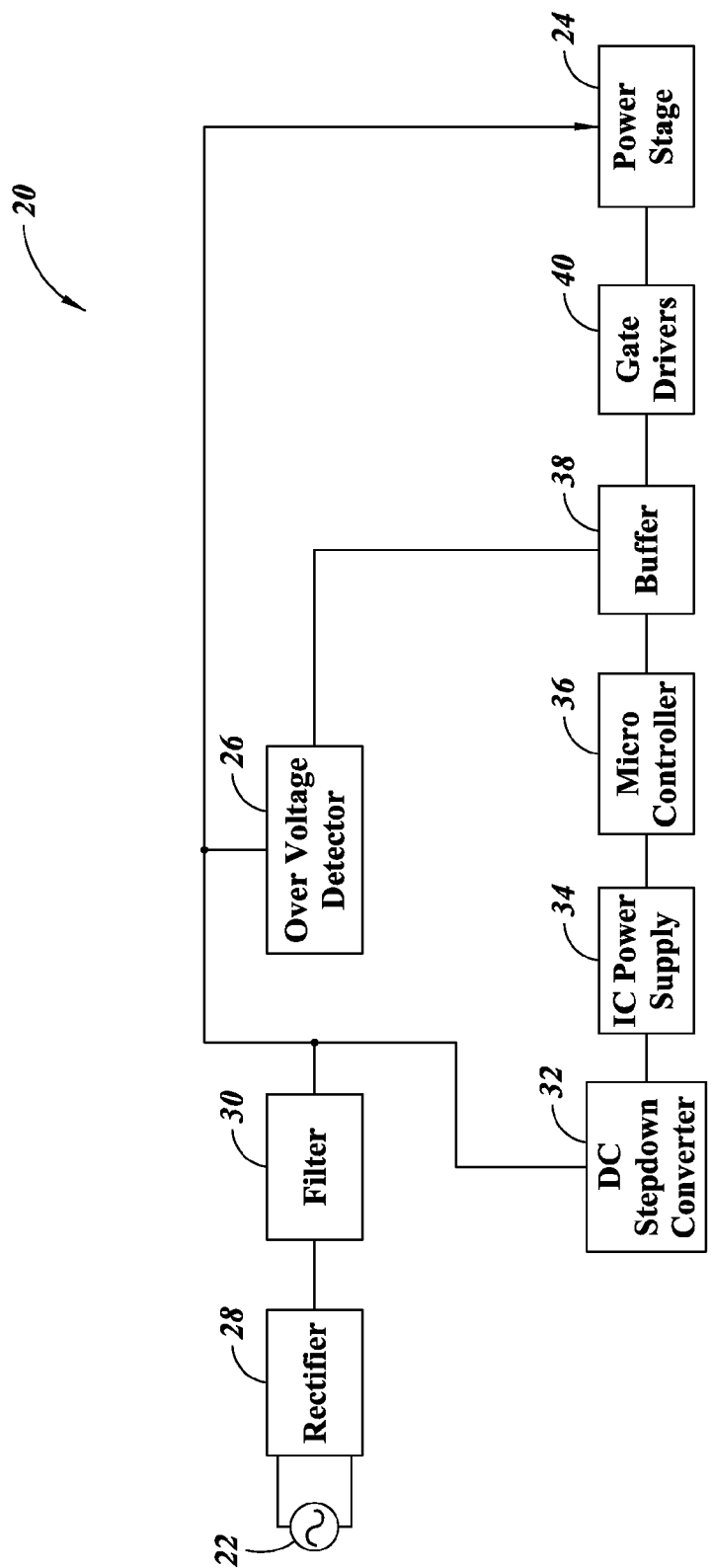
FIG. 2 is a block diagram of a bridge circuit including an overvoltage detector, according to one embodiment.

FIG. 2 is a block diagram of a bridge circuit 20, according to one embodiment. The bridge circuit 20 includes a voltage source 22 coupled to a rectifier 28. The rectifier 28 is further coupled to a filter 30. The filter 30 is further coupled to an overvoltage detector 26, a power stage 24, and a DC step down converter 32. The DC step down converter 32 is coupled to an IC power supply 34. The IC power supply 34 is coupled to a microcontroller 36 and to a buffer 38. The buffer 38 is coupled to the overvoltage detector 26 and to the gate drivers 40. The gate drivers 40 are coupled to the power stage 24.

In one embodiment, the voltage source 22 outputs an AC voltage. The voltage source is, for example, a municipal power supply that typically supplies an AC voltage to buildings and homes. The AC voltage is typically between 110 V and 265 V, depending on the region of the municipal power supply. Alternatively, the AC voltage can have any other value.

The AC voltage is provided to the rectifier 28. The rectifier 28 rectifies the AC voltage and outputs a DC voltage. The DC voltage is passed to a filter 30. The filter 30 filters noise and transients from the DC voltage and outputs a supply voltage. The filter outputs the supply voltage to the overvoltage detector 26, the power stage 24, and the DC step down converter 32.

The DC step down converter 32 receives the DC voltage and steps down the DC voltage. The DC step down converter 32 is therefore a DC to DC step down converter that receives the DC voltage from the filter 30 and outputs a reduced DC voltage. The DC step down converter 32 supplies the reduced DC voltage to the IC power supply 34. The reduced DC voltage is, for example, 15 V or another voltage that may be commonly used in electronic devices that run on DC voltage.

The IC power supply 34 receives the reduced DC voltage and outputs a low regulated voltage to the microcontroller 36. The low regulated voltage powers the microcontroller 36. The low regulated voltage is, for example, between 3 and 5 V. Alternatively, the low regulated voltage can have another value suitable as a supply voltage for a microcontroller or other types of integrated circuit.

The microcontroller 36 controls the switches of the power stage 24. In particular, the microcontroller 36 outputs control signals to the gate drivers 40 via a buffer 38. The gate drivers 40 receive the control signals and modulate the switches of the power stage 24. In particular, the gate drivers 40 activate and deactivate the switches of the power stage 24 according to a modulation scheme dictated by the control signals output by the microcontroller 36.

The power stage 24 supplies output voltages to a load. In particular, the power stage 24 can provide an output voltage from the midpoint of each series pair of switches. In this way, the power stage 24 can output a three-phase DC voltage to control a load, such as a motor.

The bridge circuit 20 can be included in an appliance such as a fan, a washing machine, a dryer, an air conditioning unit, or any other electrical device that includes a motor or other type of load that can be driven by a bridge circuit. The bridge circuit 20 controls the motor. In one embodiment, the bridge circuit 20 can cause the motor to operate bidirectionally. The motor can be a brushless motor or a motor with brushes.

Sometimes the municipal power grid that supplies the AC voltage to the voltage source 22 is subject to occasional voltage fluctuations. Such fluctuations can occur for a variety of reasons, including sudden increased demand on the power grid, sudden decreased demand on the power grid, disruptions in power lines, short-circuits, variations in a power generation station, software failures in a grid control service, or for many other reasons. While typically such fluctuations are minor and short in duration, in some cases the fluctuations can be large and can last for a relatively long time. In these cases, the AC voltage can be too high for the power stage 24 to operate safely. In particular, when the AC voltage provided by the voltage source 22 is in an overvoltage condition, the rectifier 28 may rectify the AC voltage into a DC voltage that is also in an overvoltage condition. In some rare circumstances a three-phase voltage can be rectified by the DC voltage, thereby providing a DC voltage that is two or three times higher than the standard DC voltage in normal operating conditions. If such a high DC voltage is provided to the power stage 24, the entire supply voltage can appear across individual switches of the power stage 24 as the individual switches are turned on and off by the gate drivers 40. In order to withstand such high voltages across a single switch, traditionally each switch would have an individual maximum voltage rating with the value of the entire voltage that might appear across the power stage 24. Thus, in order to adequately protect against overvoltage situations the switches of the power stage 24 are sometimes quite large and expensive so that they may withstand very high voltages.

The overvoltage detector 26 of FIG. 2 helps to overcome some of the drawbacks of traditional bridge circuits. In particular, the overvoltage detector 26 is a high-speed overvoltage detector. The high-speed overvoltage detector 26 receives the supply voltage from the filter 30 and detects whether the supply voltage is in an overvoltage condition. If the supply voltages in an overvoltage condition, the high-speed overvoltage detector 26 rapidly outputs a disabled signal to the buffer 38. The buffer 38 receives the disable signal and prevents the control signals from the microcontroller 36 from passing to the gate drivers 40. The gate drivers 40 immediately deactivate all switches of the power stage 24. In this way, the switches of the power stage 24 are deactivated before they can be damaged by the overvoltage condition.

Because each of the switches of the power stage 24 is fully disabled by the disable signal, the entire DC voltage appears across each of the pairs of switches rather than across any individual switch. In this way each individual switch is subject to only about half of the entire high DC voltage. Thus, each of the switches of the power stage 24 can have a maximum voltage rating that is about half the maximum voltage rating of the power stage 24. If the maximum voltage rating of the power stage 24 is 600 V, then each of the switches of the power stage 24 can have a maximum voltage rating of about 300 V instead of the full 600 V. Thus, the switches of the power stage 24 can be reduced in size in comparison to traditional bridge circuit switches while still providing the same overall maximum voltage rating of the power stage 24. Alternatively, the power stage 24 can have switches that have similar power ratings compared to traditional bridge circuits, thereby providing a power stage 24 with a maximum voltage rating that is double that of traditional bridge circuits.

The ability of the bridge circuit to withstand overvoltage conditions is doubled. As one example consider the case of single phase 85V to 285V AC universal wide range supply voltage. In this situation, the maximum rectified voltage will be approximately 403 VDC (285*Square root of 2). This voltage can be easily sustained individually be switches rated at 500V to 600V DC. But if there are higher voltages appearing across the bridge circuit due to any of the reasons mentioned, the switches will be damaged if they are still being operated as if under normal conditions. MOV (Metal Oxide Varistor) and TVS (Transient Voltage Suppressor) Diode at the input can only take care of short term overvoltage conditions, so something should be done to handle sustained overvoltage conditions. Sustained high voltage conditions typically require expensive additional circuits which either dissipate the excess voltage through a load or disconnect the supply during overvoltage condition (additional switching devices required). By use of the inventive concepts as taught here, by judiciously turning off both the switches in a half bridge during overvoltage conditions, they can protect themselves from overvoltage conditions indefinitely without the cost penalty due to use of additional high voltage switches. The capability of the power stage to withstand overvoltage fault conditions is doubled. Cost savings is realized because the designer does not now need to use overrated switches to accommodate for the highest expected sustained overvoltage conditions.

In one embodiment, the overvoltage detector 26 detects an overvoltage condition by comparing the supply voltage to a threshold voltage. If the supply voltage is higher than the threshold voltage, then the overvoltage detector 26 outputs the disable signal. If the supply voltage is lower than the threshold voltage, then the overvoltage detector 26 outputs an enable signal that enables the buffer 38 to continue to provide the control signals from the microcontroller 36 to the gate drivers 40. Thus, the gate drivers 40 can continue to modulate the switches of the power stage 24.

Figure 3:
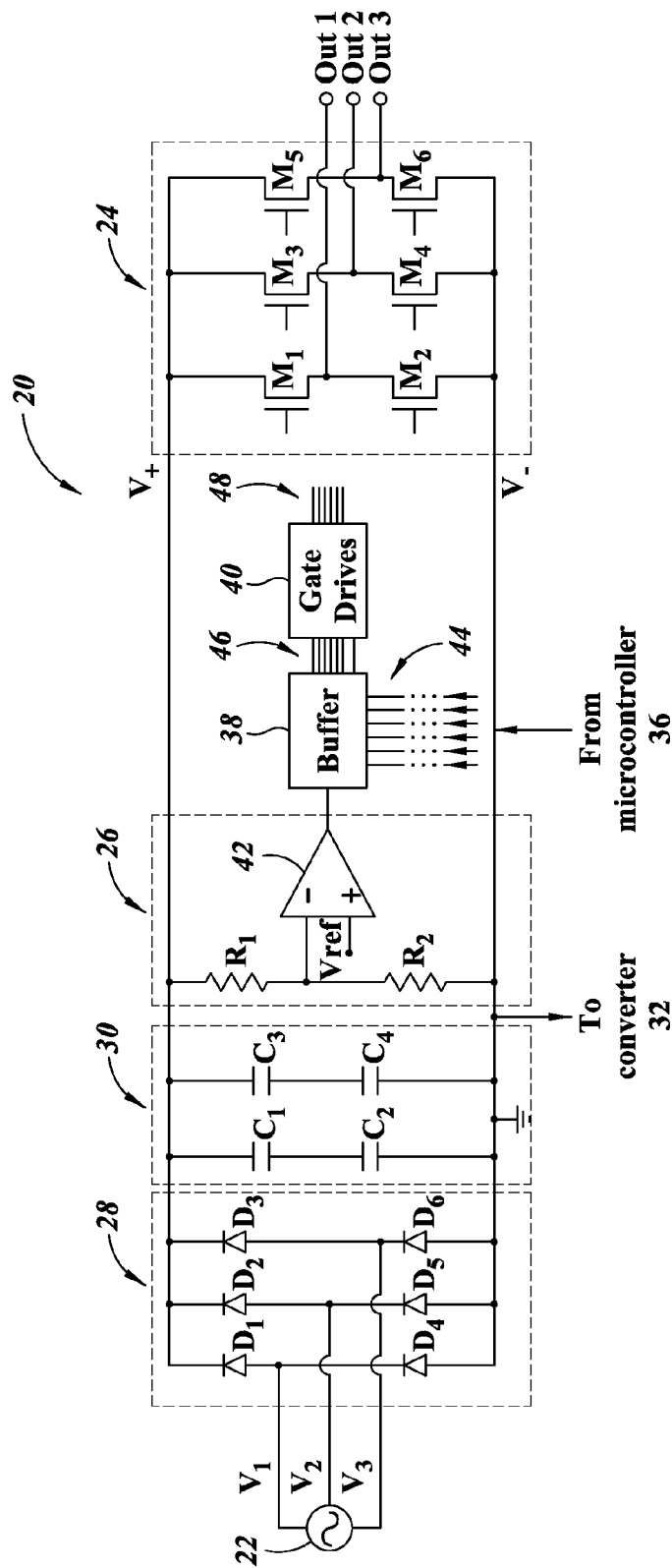
FIG. 3 is a schematic diagram of a bridge circuit including an overvoltage detector, according to one embodiment.

FIG. 3 is a schematic diagram of a bridge circuit 20 including an overvoltage detector 26, according to one embodiment. The bridge circuit 20 includes a voltage source 22, the rectifier 28 coupled to the voltage source 22, a filter 30 coupled to the rectifier 28, the overvoltage detector 26 coupled to the filter 30, a buffer 38 coupled to the overvoltage detector 26, gate drivers coupled to the buffer 38, and a power stage 24 coupled to the gate drivers 40 and the filter 30.

The voltage source 22 is a three-phase AC voltage supply that provides a three-phase AC voltage. The three-phase AC voltage is applied via three voltages V1, V2, V3, which are 120° out of phase with each other. Each of the voltages V1, V2, V3 are provided to the voltage rectifier 28.

The voltage rectifier 28 includes three pairs of diodes D1-D6. Each pair of diodes includes two diodes coupled in series between a high supply rail and a low supply rail. The AC voltage V1 is received by the rectifier 28 between diodes D1 and D4. The AC voltage V2 is received by the rectifier 28 between diodes D2 and D5. The AC voltage V3 is received by the rectifier 28 between the diodes D3 and D6. The rectifier 28 rectifies the three-phase AC voltage and outputs a rectified voltage. The anodes of the diodes D4-D6 are coupled to ground. The cathodes of the diodes D1-D3 are coupled to a high supply rail.

The filter 30 includes a first pair of capacitors C1, C2 coupled in series between the high supply rail and ground. A second pair of capacitors C3, C4 is also coupled between the high supply rail and ground. A first inductor L1 is coupled between C1 and C3. A second inductor L2 is coupled between C3 and the overvoltage detector 26. The filter 30 filters the rectified voltage and outputs a supply voltage to the power stage 24 and the overvoltage detector 26.

The power stage 24 includes six power transistors M1-M6 coupled in three half bridge circuits. A first half bridge circuit includes transistors M1, M2 coupled together in series between ground and the supply voltage. A second half bridge circuit includes transistors M3, M4 coupled together in series between ground and the supply voltage. A third half bridge circuit includes transistors M5, M6 coupled together in series between ground and the supply voltage. The power stage 24 includes three outputs Out1, Out2, and Out3. Out1 is coupled between M1, M2. Out2 is coupled between M3, M4. Out3 is coupled between M5, M6. While the example of FIG. 3 discloses MOS transistors, other types of switches such as bipolar transistors, IBGTs, etc. can be used in place of MOS transistors in accordance with principles of the present disclosure.

The power stage 24 is coupled to receive input from the gate drivers 40. The circuits for the converter 32, power supply 34 and controller 36 are not shown since these circuits are well known and their connection is shown in FIG. 2. The gate drivers 40 control the individual gate terminals of the transistors M1-M6 via signal lines 48. The gate drivers 40 receive control signals from the microcontroller 36 via the buffer 38. In particular, the buffer 38 provides the control signals from the microcontroller 36 to the gate drivers 40 via the signal lines 46. The control signals cause the signal lines 46 to modulate the transistors M1-M6 in a particular sequence such that at any given time only one transistor of each half bridge circuit is enabled. In this way, Out1-Out3 each alternate between ground voltage and the supply voltage with a particular timing in accordance with the control signals. The voltages supplied by Out1-Out3 can drive a load, such as a motor. The power stage 24 can drive in motor in a bidirectional manner or in a unidirectional manner. Alternatively, Out1-Out3 can drive another type of load.

In order to prevent damage to the transistors M1-M6 the bridge circuit 20 includes an overvoltage detector 26. The overvoltage detector 26 includes a high-speed comparator 42 and a voltage divider made up by resistors R1 and R2 coupled between ground and the supply voltage. The resistors R1 and R2 divide the supply voltage according to a voltage divider ratio and provide the divided voltage to the inverting input of the high-speed comparator 42. Thus, the inverting input of the high-speed comparator 42 receives a divided voltage that is representative of the supply voltage. The noninverting input of the high-speed comparator 42 receives a fixed reference voltage Vref. Vref can be supplied to the high-speed comparator 42 by the DC step down converter 32 shown in FIG. 2.

The high-speed comparator 42 compares the supply voltage to a threshold voltage by comparing the divided voltage to the reference voltage Vref. If the divided voltage is higher than the reference voltage, then the supply voltage is in an overvoltage state. If the supply voltage is in an overvoltage state, the high-speed comparator 42 rapidly outputs a disable signal to the buffer 38. The buffer 38 receives the disable signal and prevents the control signals from the microcontroller 36 from being passed to the gate drivers 40. The gate drivers 40 immediately deactivate all switches M1-M6 of the power stage 24. The high-speed comparator 42 detects the overvoltage condition and outputs the disable signal so quickly that the switches of the power stage 24 are disabled before they can be damaged by the overvoltage condition present in the supply voltage.

According to one embodiment, the high-speed comparator 42 has a propagation delay of about 10 ns. The threshold voltage can be slightly less than half the maximum voltage rating of the power stage 24.

In one example, the voltage source 22 supplies 230 V AC to the rectifier 28. If the neutral connection (one of V1-V3) gets disconnected, a line to line fault occurs by which the available voltage supplied by the voltage source 22 can become approximately 415 V AC as opposed to 230 V AC. In such a case, the rectified voltage output by the rectifier can be approximately 585 V DC. If the voltage supply is higher than 230 V AC, which can happen for homes/buildings that are closer to a distribution transformer, then voltages much higher than 600 V DC can be output by the rectifier 28. For this reason traditional bridge circuits have included switches in the power stage with a maximum voltage rating of 800 V or more. Such high voltage switches can be several times more expensive than a switch with only a 400 V rating. Because the bridge circuit 20 implements a fast shutdown of the power stage 24 whenever the overvoltage condition occurs, the maximum voltage tolerable by the power stage can increase to double the individual switch rating without affecting normal operation. Thus, each individual switch can have a maximum voltage rating that is half the total voltage rating of the power stage 24. In one example, the power stage 24 could have a maximum voltage rating of 800 V if each individual transistor had a maximum voltage rating of 400 V. This can greatly reduce the cost of the power switches of the power stage 24.

Figure 4:
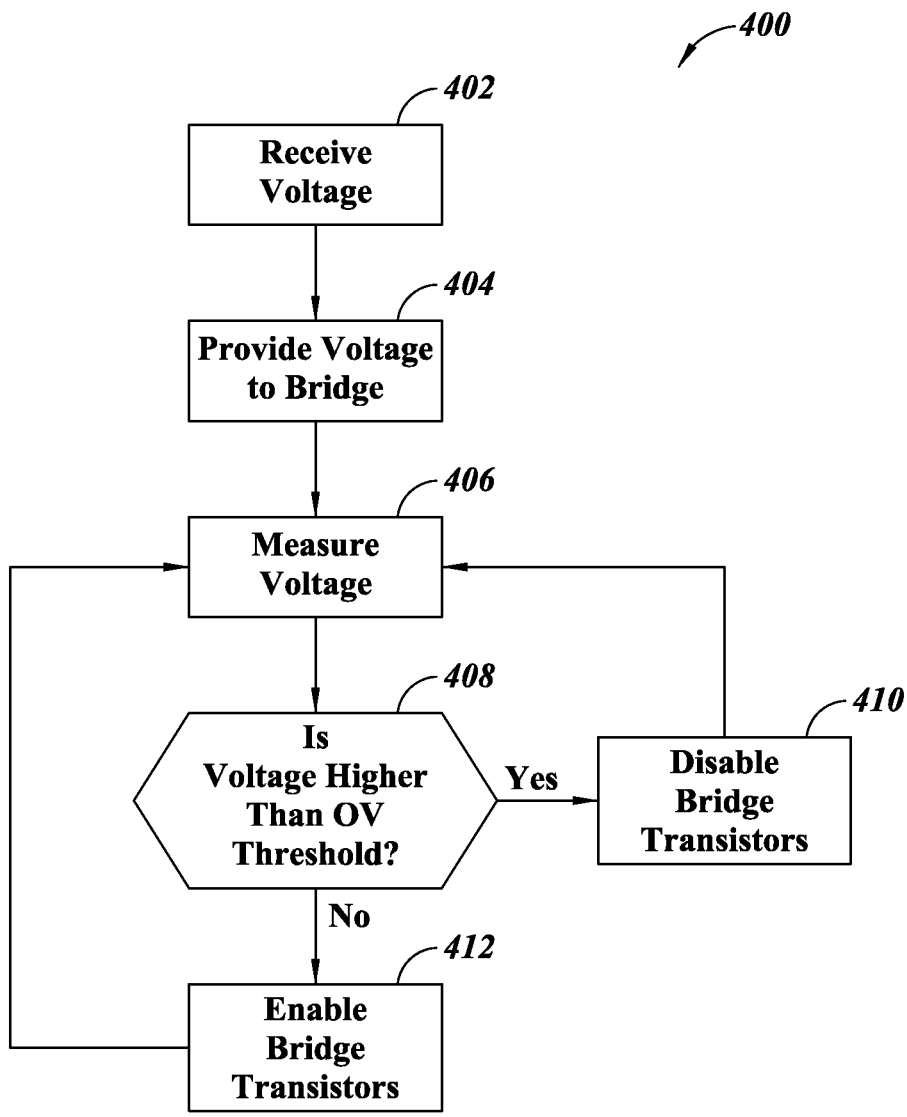
FIG. 4 is a flow diagram of a process for operating a bridge circuit, according to one embodiment.

FIG. 4 is a flow diagram of a process 400 for operating a bridge circuit, according to one embodiment. At 402 a supply voltage is generated. At 404 the supply voltage is supplied to the bridge circuit. At 406 the magnitude of the supply voltage is sensed. At 408 if the magnitude of the supply voltage is greater than an overvoltage threshold, then at 410 the bridge transistors are disabled. If the magnitude of the supply voltage is lower than the overvoltage threshold, then at 412 the bridge transistors are enabled. The supply voltage is continuously checked at 406 such that if at any time the supply voltage is higher than the overvoltage threshold, then the bridge transistors can be disabled. In this way the transistors of the bridge circuit can be protected from damage by an overvoltage condition, according to one embodiment.

Figure 5:
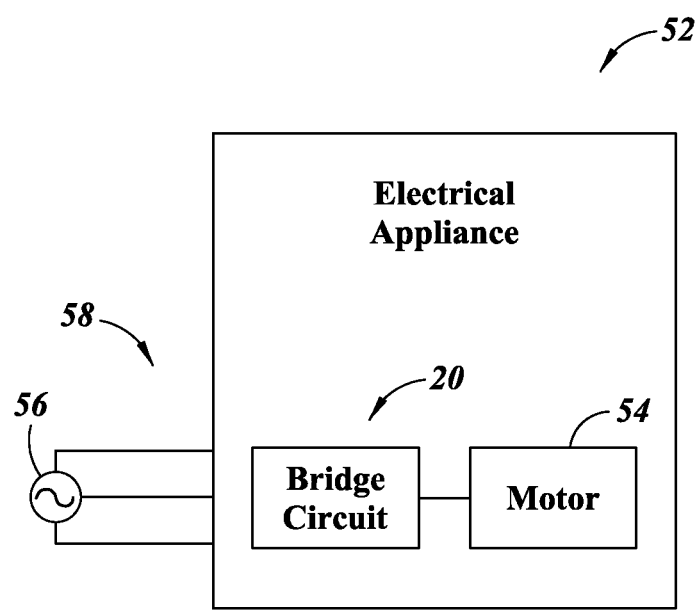
FIG. 5 is a block diagram of an electrical appliance including a bridge circuit, according to one embodiment.

FIG. 5 is a block diagram of an electrical appliance 52, according to one embodiment. The electrical appliance 52 includes a bridge circuit 20 and the motor 54. The electrical appliance receives a voltage, such as an AC voltage from a voltage source 56, such as a three phase voltage source supplied by a municipal power grid. The bridge circuit 20 receives the voltage and drives the motor 54. The bridge circuit 20 can include an overvoltage detector 26, and a power stage 24 is disclosed with respect to FIGS. 1-3. The bridge circuit 20 therefore includes in situ overvoltage protection that can rapidly shut down the switches of the power stage 24 before the switches or the motor 54 are damaged. The electrical appliance 52 can be a fan, an air conditioner, a kitchen appliance, an industrial appliance, or any other kind of appliance that includes a motor or other load that can be driven by the bridge circuit 20. The electrical appliance 52 is protected from overvoltage conditions by the bridge circuit 20. This can reduce or eliminate the need for other overvoltage protection schemes that can be quite costly and cumbersome.

While particular circuit blocks, circuit components, configurations and operating methods have been disclosed in relation to FIGS. 1-5, those of skill in the art will recognize that many other circuit components, configurations, and operating methods can be implemented in accordance with principles of the present disclosure. All such other components, configurations, and methods fall within the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A bridge circuit, comprising:
   a voltage source that supplies a supply voltage;
   a microcontroller;
   a power stage that receives the supply voltage and provides one or more output voltages, the power stage including one or more half bridge circuits each having a respective pair of switches connected in series, each of the switches having a voltage rating that is about half of a maximum voltage rating for the power stage;
   a gate driver coupled to the power stage;
   a buffer stage coupled to the gate driver and to the microcontroller, the buffer stage receives control signals from the microcontroller, and controls operation of the switches of the power stage based on the control signals; and
   an overvoltage detector coupled to the buffer stage, the overvoltage detector receives the supply voltage, detects whether the supply voltage is higher than a threshold voltage, and, if the supply voltage is higher than the threshold voltage, outputs an overvoltage signal to the buffer stage that causes the buffer stage to prevent the control signals from the microcontroller from passing to the gate driver, and that causes the gate driver to turn off all of the switches of the power stage before the switches are damaged by the supply voltage.

2. The bridge circuit of claim 1 wherein the overvoltage detector includes a comparator that compares the supply voltage to a reference voltage indicative of the threshold voltage and outputs the disable signal if the supply voltage is higher than the reference voltage.

3. The bridge circuit of claim 2 wherein the overvoltage detector includes:
   a first input; and
   a voltage divider that divides the supply voltage and supplies to the first input a divided voltage indicative of the supply voltage.

4. The bridge circuit of claim 3 wherein the comparator includes a second input that receives the reference voltage, wherein the comparator compares the reference voltage to the divided voltage.

5. The bridge circuit of claim 1 wherein the microcontroller causes modulation of the switches of the power stage by generating the control signals and outputting the control signals to the gate driver.

6. The bridge circuit of claim 5 wherein the gate driver receives the control signals and modulates the switches based on the control signals.

7. The bridge circuit of claim 6 wherein the overvoltage signal causes the gate driver to turn off all the switches.

8. The bridge circuit of claim 1, further comprising a motor coupled to the power stage and receiving the output voltages from the power stage.

9. A method, comprising:
generating a supply voltage;
passing the supply voltage to a power stage of a bridge circuit, the power stage including a plurality of switches;
controlling the plurality of switches of the power stage by an output of a buffer stage, based on control signals received from a microcontroller, the buffer stage being coupled to a gate driver that is coupled to the plurality of switches of the power stage;
passing the supply voltage to an overvoltage detector that is coupled to the buffer stage;
detecting whether the supply voltage is higher than a threshold voltage;
outputting a disable signal from the overvoltage detector to the buffer stage if the supply voltage is higher than the threshold voltage;
preventing, by the buffer, the control signals from the microcontroller from passing to the gate driver, based on the disable signal; and
turning off the plurality of switches of the power stage based on the disable signal,
wherein each of the switches have a voltage rating that is about half of a maximum voltage rating for the power stage.

10. The method of claim 9, further comprising turning off the switches before the supply voltage damages the switches.

11. The method of claim 10, further comprising:
comparing, with a comparator, the supply voltage to a reference voltage indicative of the threshold voltage; and
outputting the disable signal if the supply voltage is higher than the reference voltage.

12. The method of claim 11, further comprising:
generating a divided voltage indicative of the supply voltage;
supplying the divided voltage to a first input of the comparator;
supplying the reference voltage to the comparator; and
outputting the disable signal from the comparator if the divided voltage is greater than the reference voltage.

13. The method of 9, further comprising:
generating the control signals by the microcontroller; and
outputting the control signals to the gate driver, via the buffer stage, the gate driver coupled between the microcontroller and the power stage.

14. The method of claim 13, further comprising modulating the switches with the gate driver based on the control signals.

15. The method of claim 14, further comprising turning off the switches with the gate driver based on the disable signal.

16. The method of claim 9, further comprising:
outputting an output voltage from the bridge circuit; and
driving, with the output voltage, a motor coupled to the bridge circuit.

17. An electrical appliance, comprising:
a voltage source that provides a supply voltage;
a microcontroller;
a power stage that receives the supply voltage and includes a plurality of half-bridge circuits, each half bridge circuit including:
a first transistor; and
a second transistor coupled in series with the first transistor;
a gate driver coupled to the power stage;
a buffer stage coupled to the gate driver and to the microcontroller, the buffer stage receives control signals from the microcontroller, and controls operation of the switches of the power stage based on the control signals; and
an overvoltage detector coupled to the buffer stage, the overvoltage detector receives the supply voltage, compares the supply voltage to a threshold voltage, and if the supply voltage is higher than the threshold voltage, outputs a disable signal to the buffer stage that causes the buffer stage to prevent the control signals from the microcontroller from passing to the gate driver, and that causes the gate driver to turn off the transistors of the power stage; and
a motor that receives an output voltage from the bridge circuit,
wherein each of the transistors has a voltage rating that is about half of a maximum voltage rating for the power stage.

18. The electrical appliance of claim 17 wherein the overvoltage detector includes a comparator that compares the supply voltage to a reference voltage indicative of the threshold voltage and outputs the disable signal if the supply voltage is higher than the reference voltage.

19. The electrical appliance of claim 18 wherein the gate driver is coupled to the comparator and the power stage, and the gate driver modulates the transistors to drive the motor and turns off the transistors when the comparator outputs the disable signal.

* * * * *